Patented Oct. 18, 1932

1,883,657

UNITED STATES PATENT OFFICE

RALPH ETTLINGER, OF KANSAS CITY, MISSOURI, ASSIGNOR TO ETTLINGER CASAKS MANUFACTURING COMPANY, OF KANSAS CITY, MISSOURI, A CORPORATION OF MISSOURI

SAUSAGE CASING AND PROCESS OF MAKING SAME

No Drawing. Application filed March 26, 1928. Serial No. 264,947.

This invention relates to improvements in sausage casings and refers more particularly to a substitute for the animal tissues such as beef bladders, beef bungs and hog bungs now used for this purpose, artificially made casings consisting of cotton or other textile fabrics treated with a sealing material as hereafter described.

This application is a continuation in part of a previous application, Serial No. 237,991, filed December 5, 1927, which application has matured into Patent 1,676,082, dated July 3, 1928.

A material or casing of the sort described for the purpose of packing sausages must be practically air tight, insoluble in water, or insoluble to the extent that it does not soften excessively, pliable when subject to warm or desiccating conditions, and capable of allowing the passage of wood creosote flavors during the normal smoking process for the sausage contained in the casings. Another purpose of the invention is to provide a preserving agent for the sausage to which, however, in the normal operation of the process, no chemical preservative has been added, the preserving action being due to the exclusion of air and to such effect as may be had in the ordinary treatment of meat by smoking. While there are several divergent means of applying the process, the following is representative:

Eight gallons of water are added to twenty-five pounds of fresh hogskins or hog hides. This mixture is boiled down so that the solution weighs fifteen pounds and to this concentrated solution is added about two per cent of glycerine, from ten to twenty per cent of salt, and coloring matter sufficient to give the desired tint when a colored product is desired. This solution is then used to thoroughly coat one side of cheesecloth, calendered muslin, or other suitable cloth. The amount used is such that the increase in the weight of the cloth is from four to six ounces for one yard. The cloth is then subjected to wood smoke in a smokehouse, normally for a period of twenty-four hours, or for such period as is sufficient to properly dry and harden the solution and render it practically insoluble in water but yet pervious to the fumes from the smokehouse. It is desirable that the cloth should not be penetrated excessively, but merely that a coating should be formed on the surface. It is therefore necessary that the solution have a considerable viscosity and preferable that the solution should be applied hot, so that the gelatinous substance in the solution should set to a considerable extent from cooling alone. The main agent in the solution is gelatine or gelatine-like substances of animal or vegetable origin. Such materials as gelatinous extracts are made by dissolving hides or offal of any kind also gelatinous vegetable matter, such as agar-agar, gelatinous sea weeds and the like. The purpose of the glycerine is to keep the treated cloth in pliable condition. The salt is added for seasoning and preservative purposes and aids in allowing the penetration of the flavoring and preservative vapors from the smoke. The action of the smoke is not only to give flavor, to sterilize and give preservative qualities to the cloth, but also to harden or set the gelatinous materials in the extract from the hog-skins. This hardening or precipitating action is due, possibly, to the presence of aldehyde-like substances in the smoke.

The cloth can be made as above by a continuous process, the operation being carried on by first calendering it, treating it, drying it, and smoking it, in proper sequence. Or it may be carried out in part or wholly intermittently. Gelatinous extracts from animal or vegetable sources may also be used, the above material being representative of many sources of inexpensive materials suitable for my purpose. Treatment may also be effected by coating the cloth with highly viscous or concentrated skimmed milk, the active principle of which is casein.

After the cloth has been prepared for the manufacture of casings they are ordinarily sewed into about four or five sizes of sacks. These sizes are as follows:

12 × 19 inch size, which is used in place of the large beef bladders.

9 × 19 inch size, used in place of the medium beef bladders.

5½ × 24 inch size, used in place of the medium beef bung and weazand.

7 × 24 inch size, used in place of the large beef bung.

4 × 28 inch size, used in place of export hog bungs.

Under typical market conditions it has been found that the cost of manufacture of such casings in place of the natural animal casings heretofore used, is about one-half less.

After these sacks or casing bags are made and before filling, they are soaked with water and then filled with the ground meat, closed and subjected to smoking again. The purpose of smoking is to give the proper flavor and preservative qualities to the sausage and therefore it is necessary that the smoke penetrate the casings as freely as the natural casings ordinarily used. As an alternative treatment it is sometimes desirable to first fill the casings with meat and then dip them into the treating solution, after which they are smoked in the usual manner. This alternative method allows the completion of the treatment in one smoking process.

It has been found that the addition of saltpetre ($KNO_3$) to the hide solution improves its character and makes the solution more susceptible to the smoking action. Furthermore, the solution containing an amount of saltpetre takes color much more readily than the hide solution without the saltpetre. I have found that an amount of substantially one ounce of saltpetre to three pounds of the hide solution is a satisfactory mixture. It is understood that this addition of saltpetre may be varied within a suitable range without departing from the spirit of the invention.

As alternate or additional methods of making sausage casings to that previously described, I have found that by dipping the casings or bags after they have been coated with the solution, in a relatively weak solution of formaldehyde, the coating sets considerably more effectively than when reliance is put entirely on the hardening effect of the smoking operation. It is a fact that formaldehyde is the active agent in the smoking operation which sets the coating, and to dip the casings or bags after they have been coated, in a weak solution of formaldehyde, brings the active agent in more immediate and direct contact with the coating substance and facilitates and accelerates its hardening.

The formaldehyde solution is weak: successful results having been obtained with a two (2) to three percent (3%) solution. After dipping, it is impossible to detect the use of formaldehyde and this setting operation with the formaldehyde solution does not affect in any way the coating material other than the acceleration effect it has on hardening the coated material.

In order to effectively destroy all trace of formaldehyde solution and to prevent the existence of free formaldehyde, the casings after being dipped in the formaldehyde solution are immersed in an oxidizing solution. Oxidizing substances which have been used for this purpose and which have given satisfactory results are slightly acidified solutions of hypochlorides, chlorates, perchlorates and persulphates of sodium, potassium, ammonium and others.

As an alternate method of making the sausage casings, instead of coating the fabric in sheets, the fabric may be made up into casing sizes and these casings placed upon frames which are shaped to hold the casing in an extended or stretched position. The casings are then coated over their outer surfaces with the coating solution hereinbefore described and the casings permitted to dry on the frames. After drying and fixing of the solution by smoking, the casings are removed and are then in proper condition for filling. The smoking operation may be practiced not only during the fixing of the coating on the fabric, but subsequent to filling.

The invention also contemplates the use of textile fabrics treated with a hog skin solution to be used as covering or sealing material for hams, bacon or other meat products.

I claim as my invention:

1. A coating for fabric meat casings comprising a viscous water solution of a gelatinous substance containing glycerine and salt petre.

2. A coating for fabric meat casings comprising a viscous extract of a gelatinous substance containing glycerine and saltpetre, said coating rendered non-adhesive by desiccating treatment with a formaldehyde solution.

3. A process for making meat casings comprising the steps of coating fabric with a gelatinous solution containing a small percentage of saltpetre, fixing the coating on the fabric by treatment with a formaldehyde solution and subjecting the treated fabric to the desiccating action of wood smoke.

4. A process for making smoked meat casings comprising the steps of coating fabric with a gelatinous solution containing a small percentage of saltpetre, fixing the coating on the fabric by treatment with a formaldehyde solution, adding sufficient glycerine to maintain the fabric in a pliable condition, and subjecting the treated fabric to the desiccating action of wood smoke.

5. The herein described sausage casing obtained by coating fabric bags with a viscous, gelatinous extract of raw hog skins and gelatin containing saltpetre, and fixing the coating on the fabric with formaldehyde, and treating the coating with an oxidizing solution.

6. A process for making sausage casings comprising the steps of coating fabric bags with a gelatinous solution of raw hogskins containing saltpetre, and fixing the coating on the fabric by treatment with formaldehyde and treating the coating with an oxidizing solution.

7. A process of making sausage casings, comprising the steps of coating fabric bags with a viscous, gelatinous extract of raw hogskins and gelatine containing saltpetre, and fixing the coating on the fabric with formaldehyde and treating the coating with an oxidizing solution.

8. A coating for fabric meat casings comprising a viscous extract of a gelatinous substance containing glycerine and saltpetre, said coating rendered non-adhesive by desiccating treatment with wood smoke.

RALPH ETTLINGER.

Patent No. 1,883,657                      Granted October 18, 1934

RALPH ETTLINGER

The above entitled patent was extended November 27, 1951, under the provisions of the act of June 30, 1950, for 6 years and 199 days from the expiration of the original term thereof.

*Commissioner of Patents.*